(12) United States Patent
Lin

(10) Patent No.: US 10,534,470 B2
(45) Date of Patent: Jan. 14, 2020

(54) FORCE TOUCH SENSING STRUCTURE, FORCE TOUCH DISPLAY DEVICE, AND FORCE TOUCH SENSING METHOD USING SAME

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Chien-Hung Lin, Hsinchu (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 22 days.

(21) Appl. No.: 16/014,172

(22) Filed: Jun. 21, 2018

(65) Prior Publication Data

US 2019/0235685 A1 Aug. 1, 2019

(30) Foreign Application Priority Data

Jan. 29, 2018 (CN) .......................... 2018 1 0083060

(51) Int. Cl.
*G06F 3/041* (2006.01)
*G06F 3/042* (2006.01)
*H04N 5/247* (2006.01)

(52) U.S. Cl.
CPC .......... *G06F 3/0414* (2013.01); *G06F 3/0425* (2013.01); *H04N 5/247* (2013.01)

(58) Field of Classification Search
CPC .. G06F 3/0414; G06F 3/0425; G06F 3/04144; B25J 13/08; B25J 13/081
See application file for complete search history.

(56) References Cited

U.S. PATENT DOCUMENTS

| 10,393,603 | B2 * | 8/2019 | Alt ............................ G01L 1/24 |
| 2012/0096952 | A1 * | 4/2012 | Amano ................... B25J 13/083 73/862.046 |
| 2012/0198945 | A1 * | 8/2012 | Yoneyama ............. B25J 13/083 73/862.042 |
| 2017/0242506 | A1 * | 8/2017 | Patel ....................... G06F 3/044 |

\* cited by examiner

*Primary Examiner* — Sardis F Azongha
(74) *Attorney, Agent, or Firm* — ScienBiziP, P.C.

(57) ABSTRACT

A force touch sensing structure which is immune to changes in sensitivity caused by external factors defines a force touch sensing area. The force touch sensing structure includes protrusions in the force touch sensing area, at least one image recognition camera, and a processor. A height of at least one protrusion varies when the force touch sensing area is force touched. The image recognition camera detects positions of the height-varied protrusions and the extent of the variations. The processor receives and processes signals from the at least one image recognition camera to obtain force touch position and touch force.

17 Claims, 7 Drawing Sheets

FORCE TOUCH SENSING STRUCTURE, FORCE TOUCH DISPLAY DEVICE, AND FORCE TOUCH SENSING METHOD USING SAME

FIELD

The subject matter herein generally relates to a force touch sensing structure, a force touch display device using the force touch sensing structure, and a force touch sensing method by using the force touch sensing structure.

BACKGROUND

A conventional force touch panel can include a capacitive force touch film. However, the capacitive force touch film has poor stability, since a capacitance of the capacitive force touch panel may change with external factors, such as ambient temperature etc. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
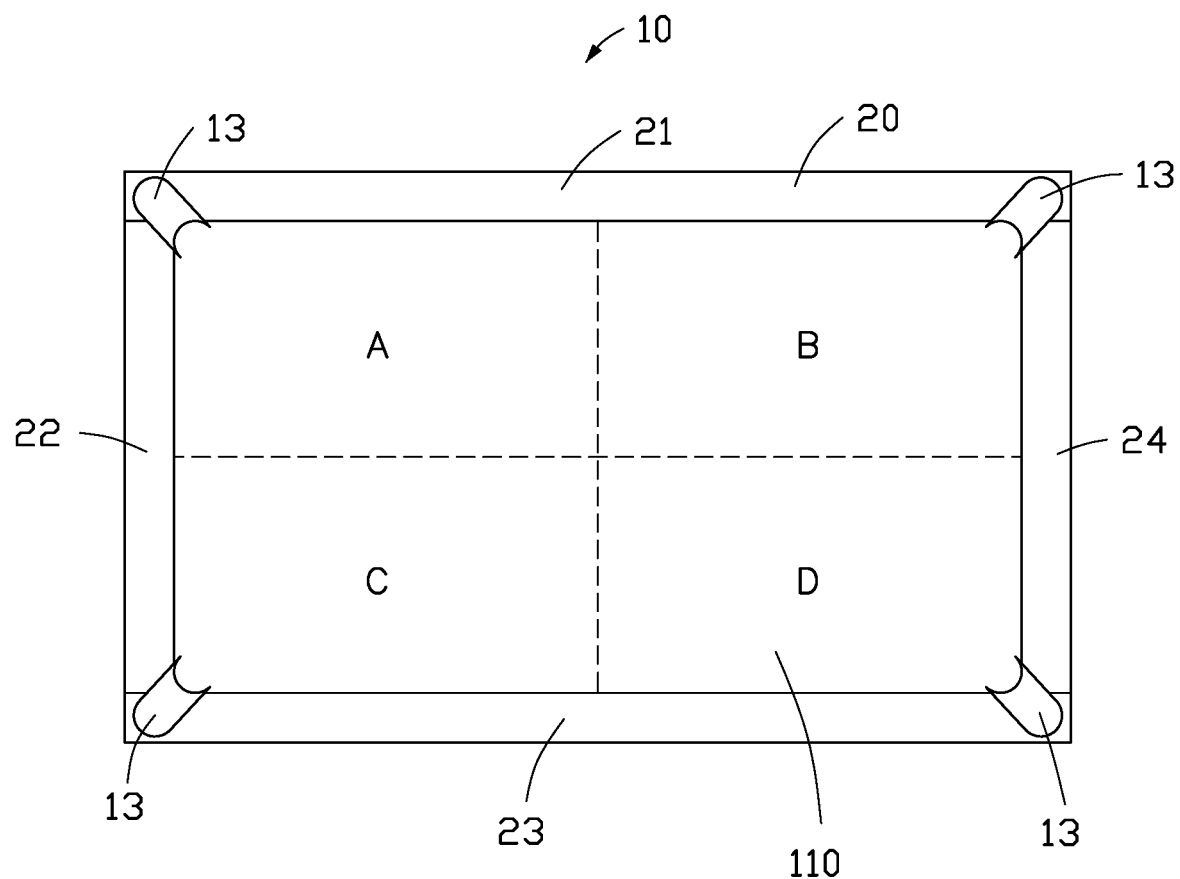
FIG. 1 is a top view of a force touch sensing structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

Figure 2:
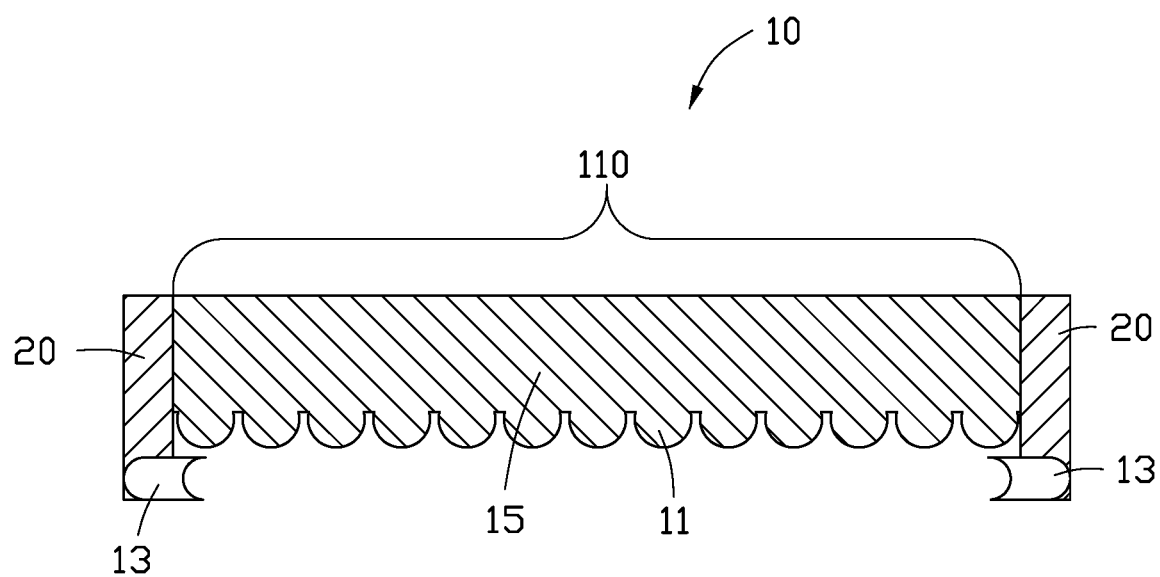
FIG. 2 is a cross-sectional view of the force touch sensing structure of FIG. 1.

FIG. 1 and FIG. 2 illustrate a force touch sensing structure 10 according to an embodiment. The force touch sensing structure 10 defines a force touch sensing area 110. The force touch sensing structure 10 includes a plurality of protrusions 11 in the force touch sensing area 110. When a region of the force touch sensing area 110 is force touched, a height of one or more protrusions 11 in the region changes. The force touch sensing structure 10 further includes at least one image recognition camera 13. The at least one image recognition camera 13 is configured to detect a position of the protrusions 11 in a region of the force touch sensing area 110 where is force-touched and variations of the relative heights of the protrusions 11 in the region.

Figure 3:
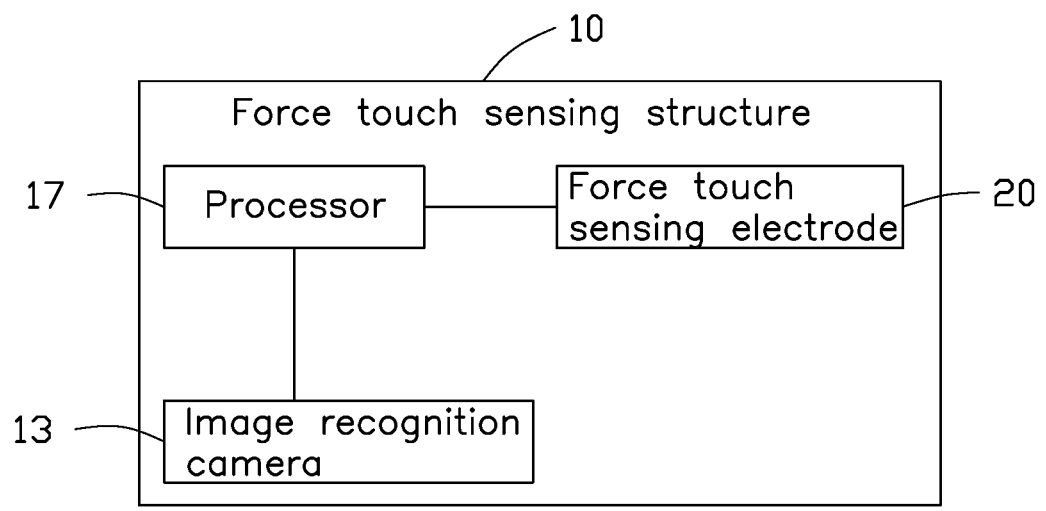
FIG. 3 is a block diagram of the force touch sensing structure of FIG. 1.

As shown in FIG. 3, the force touch sensing structure 10 further includes a processor 17. The processor 17 is electrically coupled to the at least one image recognition camera 13. Signals containing the positions and the relative heights of the protrusions 11 in the force touch region detected by the image recognition camera 13 are transmitted to the processor 17. The processor 17 processes the signals, thus a force touch position and the touch force can be obtained.

As shown in FIG. 2, the protrusions 11 are located on an elastic layer 15, and the plurality of protrusions 11 protrude from a side of the elastic layer 15. The elastic layer 15 is also located in the force touch sensing area 110. When a portion of the force touch sensing area 110 is touched by an external force, the elastic layer 15 deforms, which causes the relative heights of the protrusions 11 to change. When the external force is removed, the elastic layer 15 returns to its original shape, and the protrusions 11 in the force touch position return to their original relative heights. In the present embodiment, the plurality of protrusions 11 and the elastic layer 15 are made of a same elastic material and integrally formed. In the present embodiment, the height of each protrusion 11 is the same when there is no force on the force touch sensing structure 10.

In the present embodiment, each protrusion 11 has a hemispherical shape. The shape of the protrusion 11 may also be any regular three-dimensional shape such as a triangular pyramid shape, a cylindrical shape, and others.

As shown in FIG. 1 and FIG. 2, the force touch sensing structure 10 further includes a plurality of force touch sensing electrodes 20 surrounding the force touch sensing area 110. The force touch sensing electrodes 20 also surround the elastic layer 15 and the protrusions 11. The force touch sensing electrodes 20 are configured for detecting whether there is a force touch event in the force touch sensing area 110, and this event triggers the powering on of the corresponding image recognition camera 13. When a force touch event in the force touch sensing area 110 is detected, the corresponding image recognition camera 13 is powered on.

As shown in FIG. 1, each force touch sensing electrode 20 has a strip shape and the force touch sensing electrodes 20 are connected one-to-one and end to end. Each image recognition camera 13 is located in a region where two adjacent force touch sensing electrodes 20 interconnect. In this embodiment, the plurality of force touch sensing electrodes 20 includes four force touch sensing electrode 20 connected one-to-one in series, and there are four image identification cameras 13.

As shown in FIG. 1, the plurality of force touch sensing electrodes 20 include a first force touch sensing electrode 21, a second force touch sensing electrode 22, a third force touch sensing electrode 23, and a fourth force touch sensing electrode 24. The first force touch sensing electrode 21, the second force touch sensing electrode 22, the third force touch sensing electrode 23, and the fourth force touch sensing electrode 24 are connected one-to-one in series. The first to fourth force touch sensing electrodes 21 to 24 cooperatively surround the force touch sensing area 110. In the present embodiment, the force touch sensing area 110 is divided into four equal contiguous regions, A, B, C, and D. The region A is surrounded by the first force touch sensing electrode 21 and the second force touch sensing electrode 22. The region B is surrounded by the first force touch sensing electrode 21 and the fourth force touch sensing electrode 24. The region C is surrounded by the second force touch sensing electrode 22 and the third force touch sensing electrode 23. The region D is surrounded by the third force touch sensing electrode 23 and the fourth force touch sensing electrode 24. In the present embodiment, the force touch sensing area 110 is rectangular; and each of the four regions A, B, C, and D is rectangular.

Figure 5:
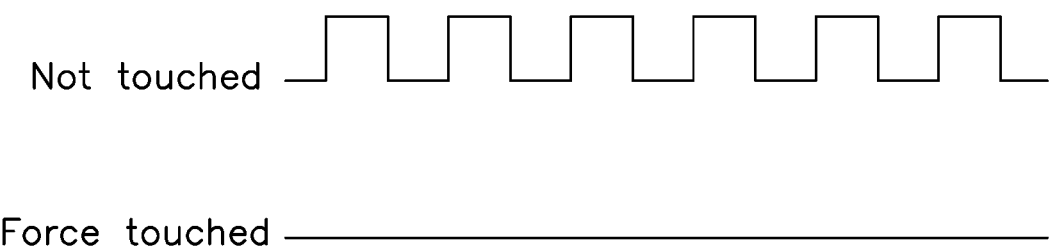
FIG. 5 shows electrical signals applied on a force touch sensing electrode of the present disclosure.

As shown in FIG. 5, the electrical signals supplied to the force touch sensing electrodes 20 are square wave AC signals. When the force touch sensing area 110 is force touched, although the force touch may not be directly applied on the force touch sensing electrodes 20, the disturbance caused by the touch force affects electrical signal output by the corresponding force touch sensing electrode 20. For example, as shown in FIG. 5, the output electrical signal of the force touch sensing electrode 20 changes to a low level signal (such as a zero potential signal). When the region A is force touched, the output electrical signal of the first force touch sensing electrode 21 and the second force touch sensing electrode 22 change. When the region B is force touched, the output electrical signal of the first force touch sensing electrode 21 and the fourth force touch sensing electrode 24 change. When the region C is force touched, the output electrical signal of the second force touch sensing electrode 22 and the third force touch sensing electrode 23 change. When the region D is force touched, the output electrical signal of the third force touch sensing electrode 23 and the fourth force touch sensing electrode 24 change. The electrical signal supplied to the force touch sensing electrode 20 may be other alternating current signals, such as sine wave or a triangular wave.

In the present embodiment, when the region A is force touched, the image recognition camera 13 located in the region where the first force touch sensing electrode 21 and the second force touch sensing electrode 21 are interconnected is powered on. When the region B is force touched, the image recognition camera 13 located in the region where the first force touch sensing electrode 21 and the fourth force touch sensing electrode 24 interconnect is powered on. When the region C is force touched, the image recognition camera 13 located in the region where the second force touch sensing electrode 22 and the third force touch sensing electrode 23 interconnect is powered on. When the region D is force touched, the image recognition camera 13 located in the region where the fourth force touch sensing electrode 24 and the third force touch sensing electrode 23 interconnect is powered on. The image recognition cameras 13 are each controlled by the processor 17.

Figure 4:
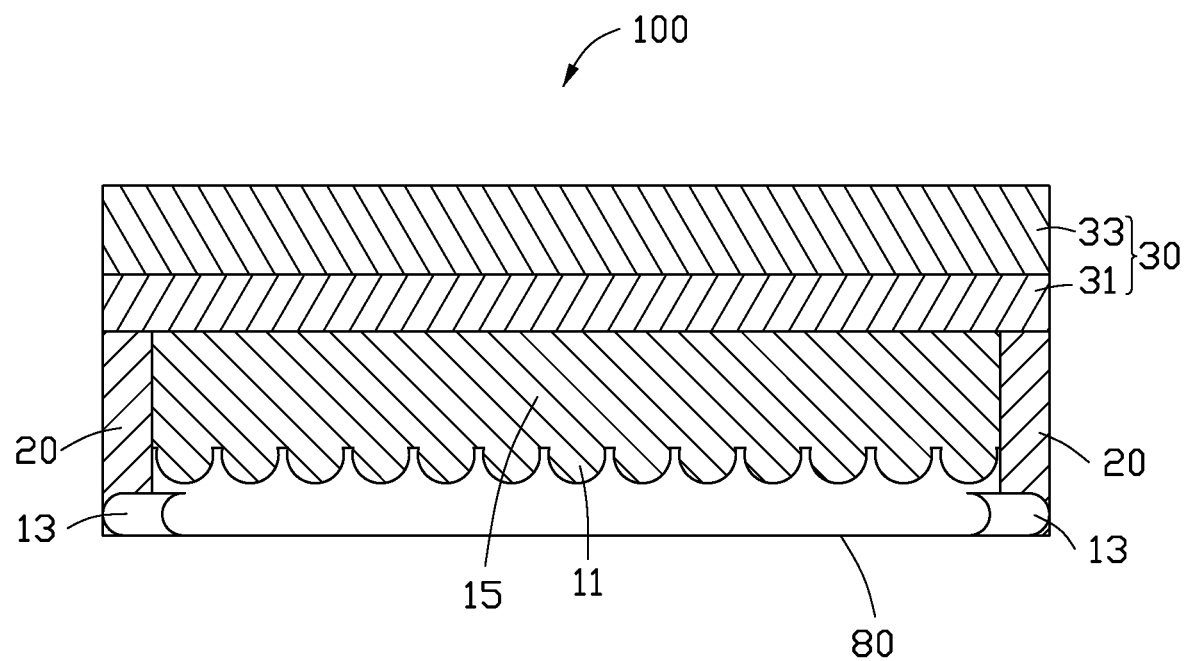
FIG. 4 is a cross-sectional view of a force touch display panel according to an embodiment of the present disclosure.

As shown in FIG. 4, a force touch display device 100 using the force touch sensing structure 10 includes a display panel 30. The force touch sensing structure 10 is located on a side of the display panel 30. In the present embodiment, the force touch sensing structure 10 is stacked below the display panel 30, and the plurality of protrusions 11 are located on a side of the elastic layer 15 away from the display panel 30. In the present embodiment, the display panel 30 includes a backplane 31 and a display module 33 stacked on the backplane 31. The backplane 31 is configured for carrying the display module 33. The force touch sensing structure 10 is stacked on a side of the backplane 31 away from the display module 33.

Figure 6:
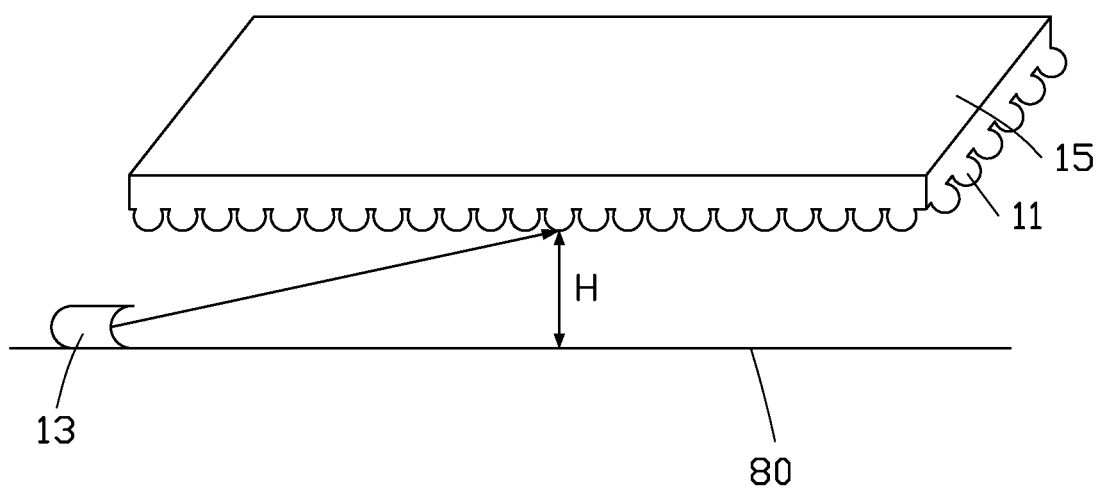
FIG. 6 is a schematic view illustrating the working of an image recognition camera according to the present disclosure.

As shown in FIG. 6, the image recognition cameras 13 detect height variations of top ends of the protrusions 11 away from of the elastic layer 15. The protrusion 11 having the greatest height variation is particularly detected. A height of the protrusion 11 and a variation thereof may be with reference to a plane 80 (shown in FIG. 4), wherein the plane 80 is a plane of the force touch sensing structure 10 away from the display panel 30. The variation of height of the protrusion 11 is equal to an initial or original height of the protrusion 11 minus a height of the protrusion 11 after being pressed.

Figure 7:
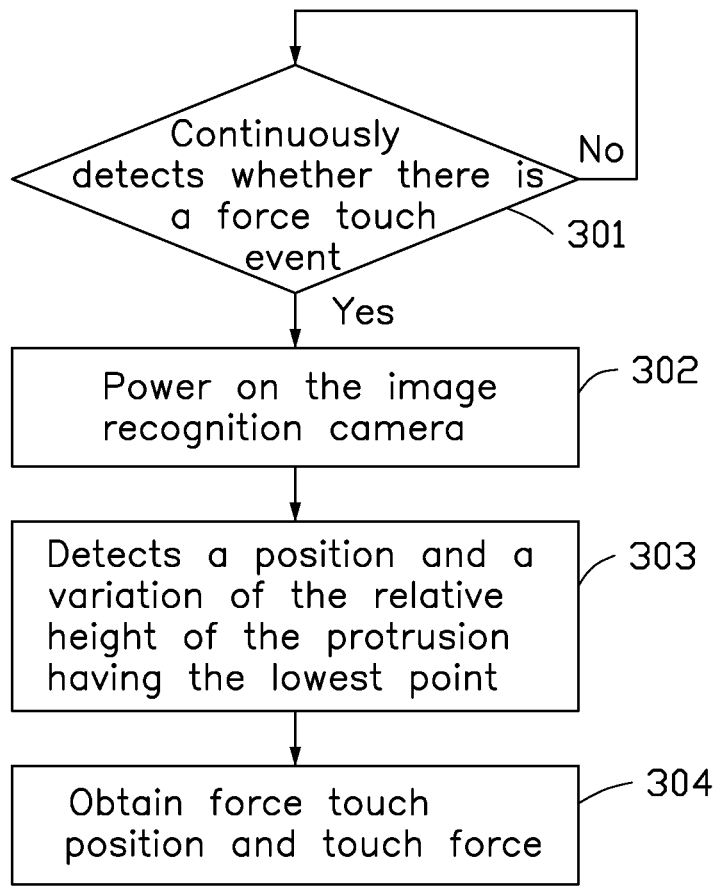
FIG. 7 is a flowchart of a force touch sensing method applied the force touch sensing structure of the present disclosure.

FIG. 7 illustrates a flowchart of one embodiment of a force touch sensing method using the force touch sensing structure 100. The example method is provided by way of example, as there are a variety of ways to carry out the method. The method described below can be carried out using the configurations illustrated in FIG. 1 and FIG. 2, for example, and various elements of these figures are referenced in explaining example method. Each block shown in FIG. 7 represents one or more processes, methods, or subroutines, carried out in the exemplary method. Furthermore, the illustrated order of blocks is by example only and the order of the blocks can change. The exemplary method can begin at block 301 according to the present disclosure. Depending on the embodiment, additional steps can be added, others removed, and the ordering of the steps can be changed.

At block 301, the force touch sensing electrodes 20 are continuously ready to detect whether there is a force touch event in the force touch sensing area 110. If yes (a force touch is detected), the process goes to block 302; if no, the processes remains in block 301.

At block 302, the image recognition camera 13 is powered on.

At block 303, the image recognition camera 13 detects a position and a variation in heights of protrusions 11, including the protrusion 11 having the greatest variation in height.

At block 304, the processor 17 receives the signals from the image recognition camera 13 and calculates to obtain force touch position and touch force.

The force touch sensing structure 10 is very stable and sensing sensitivity does not change with external factors.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A force touch sensing structure defining a force touch sensing area, the force touch sensing structure comprising:
a plurality of protrusions in the force touch sensing area, wherein a relative height of at least one of the plurality of protrusions varies when the force touch sensing area is being force touched;
at least one image recognition camera configured to detect a position of the at least one of the plurality of protrusions varying in the relative height and detect a height variation of the at least one of the plurality of protrusions; and a processor configured to receive and process signals from the at least one image recognition camera to obtain a force touch position and a touch force.

2. The force touch sensing structure of claim 1, further comprising a plurality of force touch sensing electrodes surrounding the force touch sensing area, wherein the plurality of force touch sensing electrodes surround the plurality of protrusions; the plurality of force touch sensing electrodes are configured for detecting whether there is a force touch event in the force touch sensing area.

3. The force touch sensing structure of claim 2, wherein if a force touch event in the force touch sensing area is detected, one corresponding image recognition camera is powered on.

4. The force touch sensing structure of claim 3, wherein the plurality of force touch sensing electrodes are connected one-to-one and end to end.

5. The force touch sensing structure of claim 4, wherein each of the at least one image recognition camera is located in a region that two adjacent force touch sensing electrodes interconnect; each of the at least one image recognition camera overlaps with the two adjacent force touch sensing electrodes.

6. The force touch sensing structure of claim 5, wherein the plurality of force touch sensing electrodes comprise a first force touch sensing electrode, a second force touch sensing electrode, a third force touch sensing electrode, and a fourth force touch sensing electrode;

the first force touch sensing electrode, the second force touch sensing electrode, the third force touch sensing electrode, and the fourth force touch sensing electrode are connected one-to-one and end to end;

the first force touch sensing electrode, the second force touch sensing electrode, the third force touch sensing electrode, and the fourth force touch sensing electrode cooperatively surround the force touch sensing area;

the at least one image recognition camera comprises four image recognition cameras.

7. The force touch sensing structure of claim 6, wherein the force touch sensing area comprises four regions A, B, C, and D connecting to each other;

the region A is surrounded by the first force touch sensing electrode and the second force touch sensing electrode;

the region B is surrounded by the first force touch sensing electrode and the fourth force touch sensing electrode;

the region C is surrounded by the second force touch sensing electrode and the third force touch sensing electrode;

the region D is surrounded by the third force touch sensing electrode and the fourth force touch sensing electrode;

if there is a force touch event in the region A, the image recognition camera located in a region where the first force touch sensing electrode and the second force touch sensing electrode interconnect is powered on;

if there is a force touch event in the region B, the image recognition camera located in a region where the first force touch sensing electrode and the fourth force touch sensing electrode interconnect is powered on;

if there is a force touch event in the region C, the image recognition camera located in a region where the second force touch sensing electrode and the third force touch sensing electrode interconnect is powered on; and if there is a force touch event in the region D, the image recognition camera located in a region where the third force touch sensing electrode and the fourth force touch sensing electrode interconnect is powered on.

8. The force touch sensing structure of claim 1, wherein the plurality of protrusions protrude from a side of an elastic layer; and the elastic layer is located in the force touch sensing area.

9. The force touch sensing structure of claim 8, wherein the plurality of protrusions and the elastic layer are made of a same material and integrally formed.

10. A force touch display device, comprising:
a display panel; and
a force touch sensing structure located on a side of the display panel;
the force touch sensing structure defining a force touch sensing area and comprising:
a plurality of protrusions in the force touch sensing area, wherein a relative height of at least one of the plurality of protrusions varies when the force touch sensing area is being force touched;
at least one image recognition camera configured to detect a position of the at least one of the plurality of protrusions varying in the relative height and detect a height variation of the at least one of the plurality of protrusions; and
a processor configured to receive and process signals from the at least one image recognition camera to obtain a force touch position and a touch force.

11. The force touch display device of claim 10, wherein the force touch sensing structure further comprises a plurality of force touch sensing electrodes surrounding the force touch sensing area, wherein the plurality of force touch sensing electrodes surround the plurality of protrusions; the plurality of force touch sensing electrodes are configured for detecting whether there is a force touch event in the force touch sensing area; if a force touch event in the force touch sensing area is detected, one corresponding image recognition camera is powered on.

12. The force touch display device of claim 11, wherein the plurality of force touch sensing electrodes are connected one-to-one and end to end; each of the at least one image recognition camera is located in a region that two adjacent force touch sensing electrodes interconnect; each of the at least one image recognition camera overlaps with the two adjacent force touch sensing electrodes.

13. The force touch display device of claim 12, wherein the plurality of force touch sensing electrodes comprise a first force touch sensing electrode, a second force touch sensing electrode, a third force touch sensing electrode, and a fourth force touch sensing electrode;

the first force touch sensing electrode, the second force touch sensing electrode, the third force touch sensing electrode, and the fourth force touch sensing electrode are connected one-to-one and end to end;

the first force touch sensing electrode, the second force touch sensing electrode, the third force touch sensing electrode, and the fourth force touch sensing electrode cooperatively surround the force touch sensing area;

the at least one image recognition camera comprises four image recognition cameras.

14. The force touch display device of claim 13, wherein the force touch sensing area comprises four regions A, B, C, and D connecting to each other;

the region A is surrounded by the first force touch sensing electrode and the second force touch sensing electrode;

the region B is surrounded by the first force touch sensing electrode and the fourth force touch sensing electrode;

the region C is surrounded by the second force touch sensing electrode and the third force touch sensing electrode;

the region D is surrounded by the third force touch sensing electrode and the fourth force touch sensing electrode;

if there is a force touch event in the region A, the image recognition camera located in a region where the first force touch sensing electrode and the second force touch sensing electrode interconnect is powered on;

if there is a force touch event in the region B, the image recognition camera located in a region where the first force touch sensing electrode and the fourth force touch sensing electrode interconnect is powered on;

if there is a force touch event in the region C, the image recognition camera located in a region where the second force touch sensing electrode and the third force touch sensing electrode interconnect is powered on; and if there is a force touch event in the region D, the image recognition camera located in a region where the third force touch sensing electrode and the fourth force touch sensing electrode interconnect is powered on.

15. The force touch display device of claim 10, wherein the plurality of protrusions protrude from a side of an elastic layer; and the elastic layer is located in the force touch sensing area.

16. The force touch display device of claim 15, wherein the force touch sensing structure of claim 8, wherein the plurality of protrusions and the elastic layer are made of a same material and integrally formed.

17. A force touch sensing method, comprising: continuously detecting whether there is a force touch event in a force touch sensing area; powering on one corresponding image recognition camera if a force touch event in the force touch sensing area is detected; detecting a position and a height variation of a protrusion in the force touch sensing area having a lowest point by the one corresponding image recognition camera; and obtaining force touch position and touch force according to signals from the one corresponding image recognition camera.

* * * * *